United States Patent [19]

Mori

[11] 4,214,845
[45] Jul. 29, 1980

[54] THROW AWAY INSERTS

[75] Inventor: Yoshikatsu Mori, Itami, Japan

[73] Assignee: Sumitomo Electric Industries, Ltd., Japan

[21] Appl. No.: 931,442

[22] Filed: Aug. 7, 1978

[30] Foreign Application Priority Data

Aug. 5, 1977 [JP] Japan ............................ 52-105388[U]
Aug. 24, 1977 [JP] Japan ............................ 52-113578[U]

[51] Int. Cl.² .......................... B23B 27/22; B26D 1/00
[52] U.S. Cl. ........................................................ 407/114
[58] Field of Search ........................ 407/114, 115, 116

[56] References Cited

U.S. PATENT DOCUMENTS

| | | | |
|---|---|---|---|
| 3,395,434 | 8/1968 | Wirfelt | 407/114 |
| 3,487,515 | 1/1970 | Contrucci | 407/114 |
| 3,786,541 | 1/1974 | Lundgren | 407/116 |
| 3,792,514 | 2/1974 | Ushijima | 407/114 |
| 3,815,192 | 6/1974 | Ohtsu et al. | 407/114 |
| 4,044,439 | 8/1977 | Romagnolo | 407/114 |

FOREIGN PATENT DOCUMENTS 52-98885  7/1977 Japan .

*Primary Examiner*—Leonidas Vlachos
*Attorney, Agent, or Firm*—Wenderoth, Lind & Ponack

[57] ABSTRACT

A polygonal throw away insert includes an insert body having two opposite, parallel major surfaces and a plurality of sides. A cutting edge is formed along a line where each of the sides joins each of the surfaces. A ramp extends from each cutting edge downwardly towards the center of at least one of the two major surfaces of the insert body. A pair of first chip breaking projections are provided on the ramp adjacent each corner of the insert body in a symmetrical relationship with respect to the bisector of the corner, and a second chip breaking projection is provided on the bisector behind the first projections.

5 Claims, 35 Drawing Figures

THROW AWAY INSERTS

BACKGROUND OF THE INVENTION

The present invention relates to a polygonal throw away insert which is detachably mounted on a tool holder.

Various kinds of throw away inserts having chip breaking means are commercially available, but their chip breaking capability and working strength are not necessarily satisfactory.

FIGS. 1 to 4 show a prior art triangular throw away tip or insert for both right-hand and left-hand use. This insert is provided with a chip breaking groove 52 of uniform width along a cutting edge 50 and a land 51 throughout its periphery. Some difficulties which are experienced in cutting with this type of throw away insert will be described below. Assuming that the width a of groove 52 is 3 mm, and the radius r of a nose 53 is 1.2 mm and the side cutting edge angle is 0° (FIG. 11), when the depth of cut b is not less than 4.31 mm (a cot 30° − r cot 30° + r = 4.31), the groove 52 serves satisfactorily as a chip breaker. However, when the depth is less than 4.31 mm (e.g. 3.0 mm as shown at c), the apparent breaking width d ({3.0 mm + (r cot 30° − r)} tan 60° = 6.72 mm) will be too wide for effective chip breaking. This will be understood from FIGS. 5 and 6 in which letter A designates the workpiece, B the insert, and C the chip produced in cutting. By narrowing the width of the breaking groove, the insert can be applied to cutting of a smaller cutting depth. However, this would cause choking or clogging with chips at a large depth of cut.

FIGS. 7 to 9 show another prior art triangular insert of this kind. The insert has a cutting edge 50, a land 51 and a ramp 54 sloping gently toward its center, and is provided with a semicircular projection 55 adjacent each nose 53 so that its center positions on the bisector of the nose, and a pair of small projections 56 of similar shape behind the projection 55 along the respective cutting edge. These projections 55 and 56 serve as a chip breaker. This type of throw away insert also results in difficulties similar to those mentioned above. It cannot control the chips satisfactorily when the depth of cut is small.

In case of double-sided inserts, if an appropriate amount of breaker width is given, the amount of overhang, k or l, (FIGS. 1 and 7) at the nose would be considerably large. This means insufficient support strength.

Furthermore, if such prior art throw away inserts were used as a double-sided insert, they would be supported on the cutting edges 50 and the projections 55, 56, namely on lines and points only. Clearly, this manner of support could not provide sufficient strength.

Also, such prior art throw away inserts are capable of controlling chips in internal or external cuttings by use of their nose, in which the chips curl up relatively easily into an easy-to-break shape because the thickness of chip is not uniform. In contrast, in cutting with a central portion of a cutting edge, e.g. in chamfering, the chip produced is more difficult to break because its thickness is uniform.

SUMMARY OF THE INVENTION

An object of this invention is to provide a throw away insert which permits excellent chip control regardless of the depth of cut.

Another object of this invention is to provide a throw away insert which can be used on both sides with a sufficient support strength.

A further object of this invention is to provide a throw away insert which provides proper chip control in cutting with the side or a central portion of the cutting edge as well as in cutting with its nose.

BRIEF DESCRIPTION OF THE DRAWINGS

Other objects and advantages of this invention will become apparent from the following description taken with reference to the accompanying drawings, in which, FIGS. 1-11 show prior art throw away inserts and FIGS. 12-35 show several preferred embodiments of the present invention, in which:

FIG. 1 is a plan view of a typical conventional throw away insert;

FIG. 2 is a partially enlarged plan view thereof;

FIG. 3 is a sectional view taken along the line 3—3 of FIG. 2;

FIG. 4 is a sectional view taken along the line 4—4 of FIG. 2;

FIG. 5 is a sectional view showing the condition of a chip taken along the section of FIG. 3;

FIG. 6 is a sectional view showing the condition of a chip taken along the section of FIG. 4;

FIG. 7 is a plan view of another typical conventional throw away insert;

FIG. 8 is a partially enlarged plan view thereof;

FIG. 9 is a sectional view taken along the line 9—9 of FIG. 8;

FIG. 10 is a sectional view showing the condition of a chip taken along the section of FIG. 9;

FIG. 11 is a transverse sectional plan view showing a cutting condition at zero side cutting edge angle;

FIG. 12 is a plan view of the first embodiment of the present invention;

FIG. 13 is a partially enlarged plan view thereof;

FIG. 14 is a sectional view taken along the line 14—14 of FIG. 13;

FIG. 15 is a sectional view taken along the line 15—15 of FIG. 13;

FIG. 16 is a partially enlarged plan view showing a cutting condition for a larger depth of cut;

FIG. 17 is a sectional view taken along the line 17—17 of FIG. 16;

FIG. 18 is a partially enlarged plan view showing another cutting condition for a smaller depth of cut;

FIG. 19 is a sectional view taken along the line 19—19 of FIG. 18;

FIG. 20 is a plan view of the second embodiment of the present invention;

FIG. 21 is a partially enlarged side view showing the bottom of the insert of FIG. 20 clamped on a tool holder;

FIG. 22 is a plan view of the third embodiment of the present invention;

FIG. 23 is a side view thereof;

FIG. 24 is an enlarged sectional view taken along the line 24—24 of FIG. 22;

FIG. 25 is an enlarged sectional view taken along the line 25—25 of FIG. 22;

FIG. 26 is an enlarged sectional view taken along the line 26—26 of FIG. 22;

FIG. 27 is an enlarged sectional view taken along the line 27—27 of FIG. 22;

FIG. 28 is an enlarged sectional view showing a cutting condition;

FIG. 29 is a plan view showing a cutting condition;

FIG. 30 is a plan view of the fourth embodiment of the present invention;

FIG. 31 is a side view thereof;

FIG. 32 is an enlarged sectional view taken along the line 32—32 of FIG. 30;

FIG. 33 is an enlarged sectional view taken along the line 33—33 of FIG. 30;

FIG. 34 is an enlarged sectional view taken along the line 34—34 of FIG. 30; and FIG. 35 is an enlarged sectional view taken along the line 35—35 of FIG 30.

DETAILED DESCRIPTION OF THE INVENTION

Figure 14:
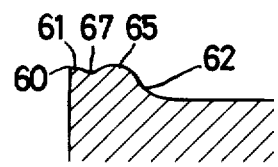
Figure 15:
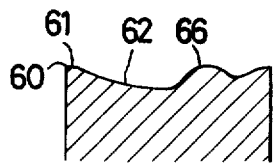

Referring first to FIGS. 12 to 15 showing the first embodiment of this invention, the triangular throw away insert has a cutting edge 60 along each side thereof, a positive land 61 inside of the cutting edge, a ramp 62, and a semicircular projection 64 having its center on the bisector of each nose 63. Between the nose 63 and the projection 64 are provided a pair of semicircular projections 65, 66 in a symmetrical position with respect to the bisector of each nose 63 at entered distances of h mm from the nose and i mm from the cutting edge. The distances, h and i, are preferably 1.5-5.0 mm and 0.5-2.2 mm, respectively, though depending on the size of the insert. A small recess 67 is formed between the cutting edge 60 and each small projection 65, 66 (FIG. 14).

Figure 1:
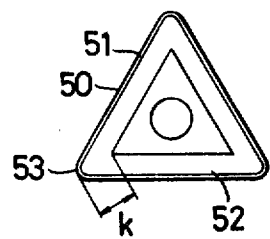
Figure 2:
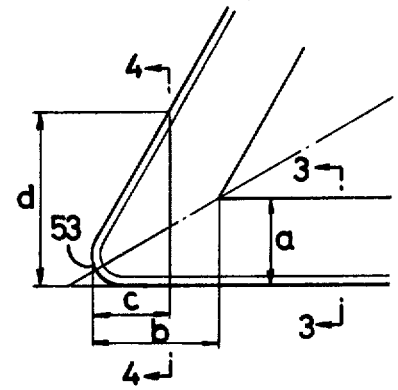
Figure 3:
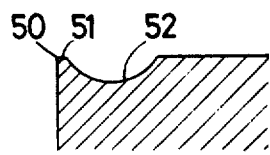
Figure 4:
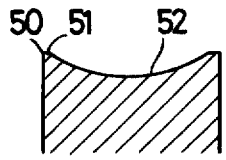
Figure 5:
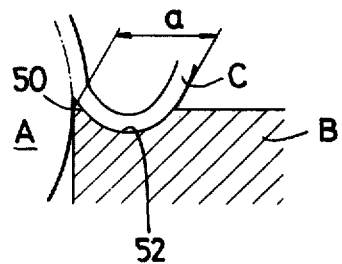
Figure 6:
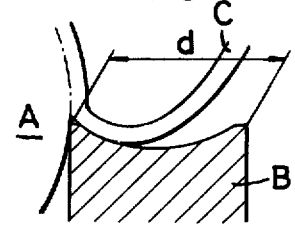
Figure 7:
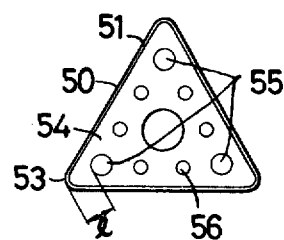
Figure 8:
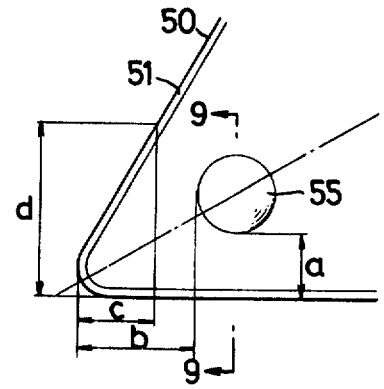
Figure 9:
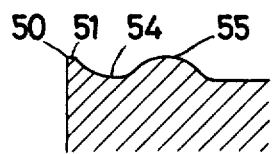
Figure 10:
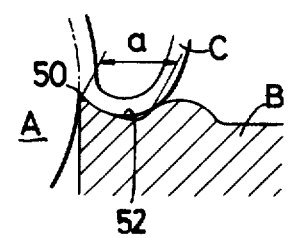
Figure 11:
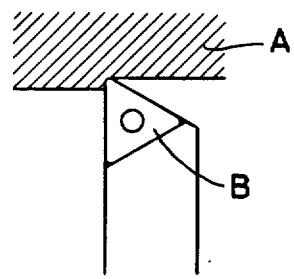
Figure 12:
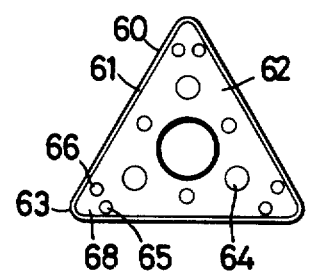
Figure 13:
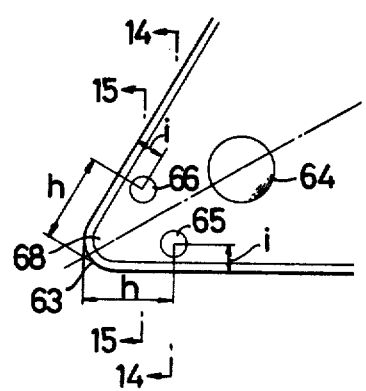
Figure 16:
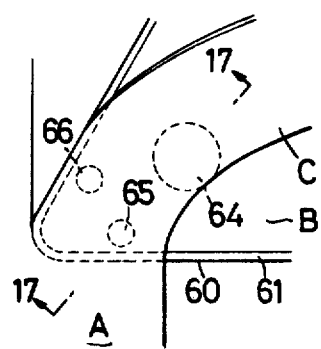
Figure 17:
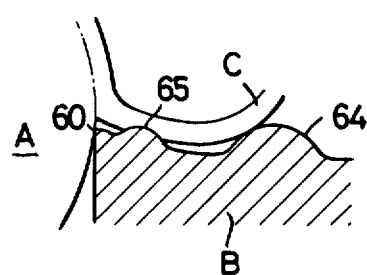
Figure 18:
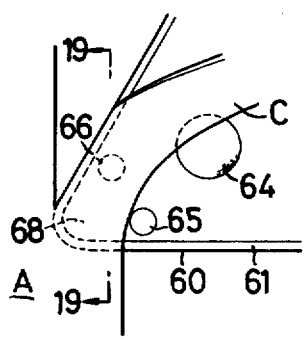
Figure 19:
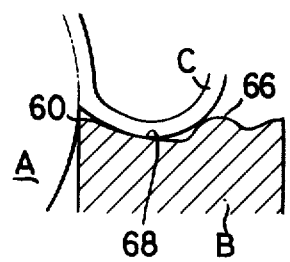

In cutting with this insert at zero cutting angle (as in FIG. 11), if the depth of cut is h(about 1.0 mm) or more, the produced chip C will advance over the projections 65 while beginning to get deformed by it, and then will be curled by the large projection 64, as will be seen from FIGS. 16 and 17. If the depth of the cut is less than the above-mentioned value, the chip C will advance along a recess 68 between the nose 63 and the small projections 65, 66 until it is curled up by the projection 66 which serves as a chip breaker, as illustrated in FIGS. 18 and 19. As mentioned above, the insert can control chips effectively in either case. Further, this insert can be used with a minimum of overhang at the nose since the two projections 65, 66 are provided adjacent the nose and the cutting edge. This assures sufficient support strength when the insert is used as a double-sided insert.

Figure 20:
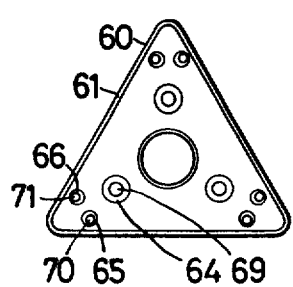
Figure 21:
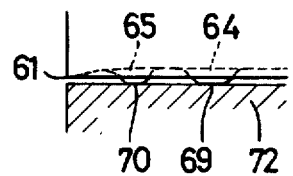
Figure 22:
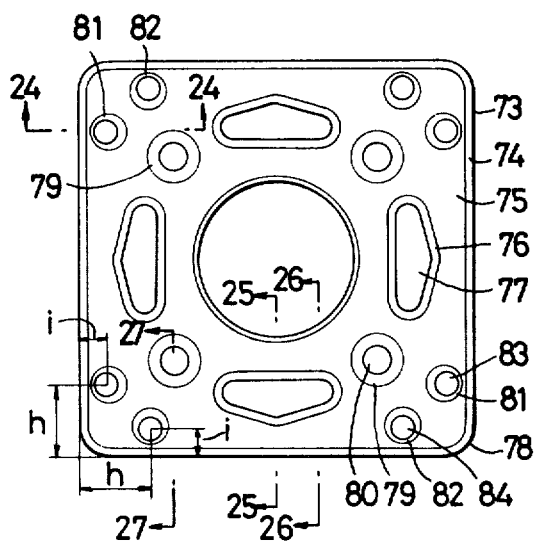
Figure 23:
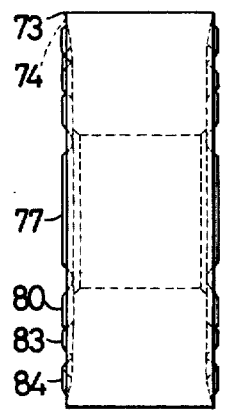
Figure 24:
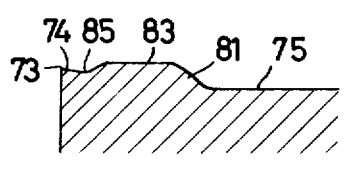
Figure 25:
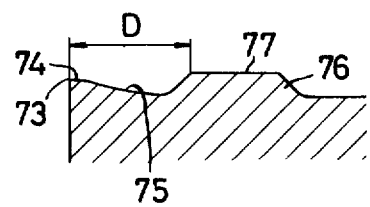
Figure 26:
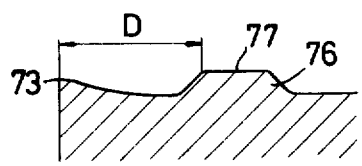
Figure 27:
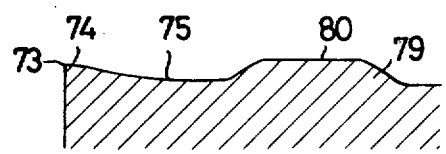

In the second embodiment of the invention shown in FIG. 20, each projection 64, 65, 66 has a flat top 69, 70, 71, respectively, which are all in the same horizontal plane to provide sufficient support area on a tool holder 72 (FIG. 21) when clamped on the tool holder. This arrangement is thus effective particularly for double-sided inserts.

The third embodiment shown in FIGS. 22 to 27 is a square throw away insert of a negative type in which the side face joins the top and bottom surfaces at a right angle to form cutting edges 73. Along each cutting edge is provided a positive land 74 which is followed by a ramp 75 having a downward gentle slope toward the center of the insert.

An elongated projection 76 preferably having a flat top 77 extends along and midway of each cutting edge 73. A medium-sized projection 79 is also provided so that its center is positioned on the bisector of each nose 78, projection 79 also having a flat top 80. Between each projection 79 and the respective nose 78 are provided a pair of projections 81, 82 symmetrically with respect to the bisector of each nose 78. The small projections may also have flat tops 83, 84. All the flat tops 77, 80, 83, 84 of these projections are in the same horizontal plane.

The small projections 81, 82 are provided at centered distances of h mm from the nose 78 and i mm from the cutting edge 73. These distances, h and i, are preferably within the same ranges as those described in the first embodiment. In this embodiment too also, a small recess 85 is formed between each small projection 81 or 82 and the positive land 74. The projection 79 and the small projections 81, 82 show substantially the same chip control capability as those in the first embodiment.

Each elongated projection 76 is so shaped that the distance D from the cutting edge is not uniform but varies from its center toward each end. In this embodiment of FIG. 22, the distance D is the smallest in its center and gradually increases toward each end of the projection 76. However, the projection 76 may be so shaped that the distance D is the largest in its center and decreases gradually toward each of its ends.

Figure 28:
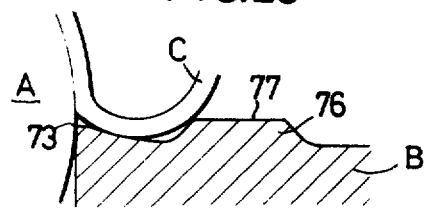
Figure 29:
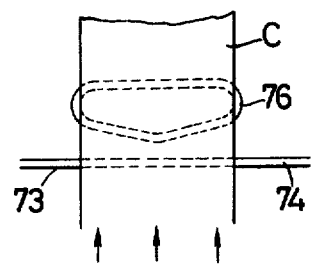
Figure 30:
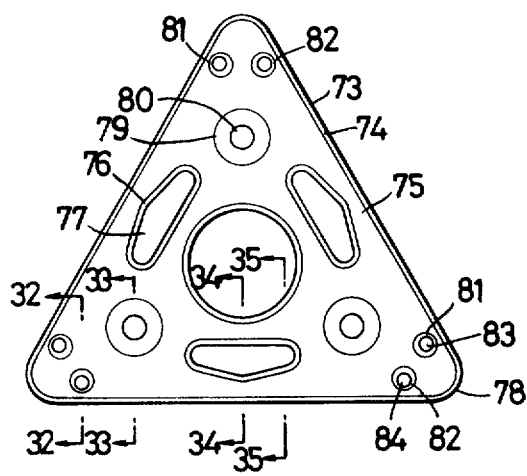
Figure 31:
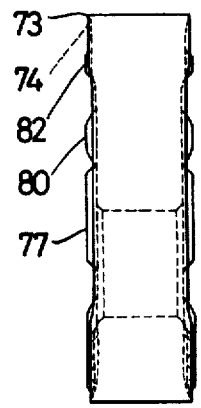
Figure 32:
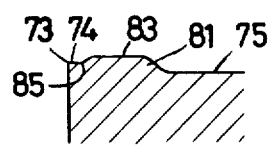
Figure 33:
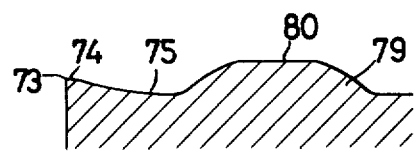
Figure 34:
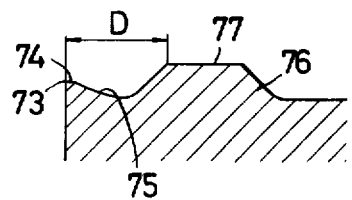
Figure 35:
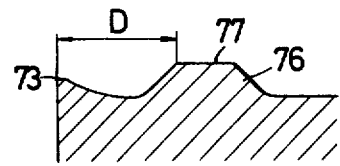

This arrangement ensures that, as seen from FIGS. 28 and 29, the chip is readily curled to be broken because the breaking width, that is, the distance to a point where the chip contacts the projection 76 varies in the direction of the width of the chip. This assures effective chip control in chamfering, that is, cutting with a central portion of the cutting edge.

As mentioned before, if the projections 76, 79, 81, 82 have flat tops 77, 80, 83, 84 in the same horizontal plane, they provide sufficient support area. Thus, this embodiment is suitable for use as a double-sided insert. However, the projection need not have flat tops if the insert is intended for use as a one-sided insert.

The fourth embodiment of this invention is a triangular version of the third embodiment and is of substantially the same configuration as the third embodiment. Similar parts are designated by the similar reference numerals. Its chip breaker projections function substantially in the same manner as those in the third embodiment.

Although this invention has been described with reference to square and triangular inserts only, it can be applied to a rhombic-shaped insert.

While this invention has been described with reference to preferred embodiments thereof, it will be understood that various changes and modifications can be made without departing from the spirit and scope of the invention.

What we claim is:

1. A polygonal throw away insert comprising:
    an insert body having two opposite, parallel major surfaces and a plurality of sides joining said major surfaces, adjacent said sides joining each other to form rounded corners;
    cutting edges being formed along lines where each of said sides join each of said surfaces;
    a ramp extending from each of said cutting edges downwardly towards the center of at least one of said two major surfaces of said insert body;
    a pair of first chip breaking projection means extending upwardly from said ramp adjacent each said corner of said insert body in a symmetrical relationship with respect to a bisector of said corner; and second chip breaking projection means separate from said first projection means and extending upwardly from said ramp at a position on said bisector and further spaced from said corner than said pair of first projection means.

2. A polygonal throw away insert as claimed in claim 1, wherein each of said first projection means is disposed at a distance of 1.5 to 5.0 mm from the respective said corner and at a distance of 0.5 to 2.2 mm from the adjacent said cutting edge.

3. A polygonal throw away insert as claimed in claim 1, wherein said first and second projection means are provided on both of said two major surfaces, and said first and second projection means on each said major surface have flat tops extending in the same horizontal plane.

4. A polygonal throw away insert as claimed in claim 1, further comprising a third elongated chip breaking projection means separate from said first and second projection means and extending upwardly from said ramp and extending along each said cutting edge between adjacent of said first projection means, said third projection means being so shaped that the distance from the respective said cutting edge to the outer side of each said third projection means, at the center of said third projection means, is different from the distance from said respective cutting edge to said outer side of said third projection means, at positions at opposite ends of said third projection means.

5. A polygonal throw away insert as claimed in claim 4, wherein the first, second and third projection means are provided on both of said two major surfaces, and said first, second and third projection means on each said major surface have flat tops extending in the same horizontal plane.

* * * * *